UNITED STATES PATENT OFFICE.

HENRY BLUMENBERG, JR., OF NEW YORK, N. Y.

BATTERY COMPOUND.

SPECIFICATION forming part of Letters Patent No. 649,654, dated May 15, 1900.

Application filed September 27, 1899. Serial No. 731,828. (No specimens.)

*To all whom it may concern:*

Be it known that I, HENRY BLUMENBERG, Jr., a citizen of the United States, residing at New York, (Wakefield,) in the borough of Bronx, State of New York, have invented a new and useful Improvement in Battery Compounds, of which the following is a specification.

One of the great defects of nearly all open-circuit batteries now on the market and using sal-ammoniac is that after the battery has been used for a period of time there begins to form on the zinc electrode and also on the carbon hard insoluble crystals of oxychlorid of zinc, which crystals when once firmly attached, especially to the carbon, are very hard to remove.

I have discovered that by adding to the chlorid-of-ammonia solution a sulfate of ammonia and also a chlorid of sodium the crystals do not form as rapidly and also that when the cell is cleaned it is quite easy to remove any incrustation that has formed, as the same is of a softer nature. This condition is, I believe, due to the fact that where a sulfate of ammonia is added to a chlorid of ammonia the oxysalt which would be formed by the ammonium sulfates is soluble, while that of the ammonium chlorid alone is not, and naturally some complex reaction occurs here which is very difficult to explain.

I have also discovered in addition that the chlorid of sodium could be used in conjunction with the sulfate of ammonium and the chlorid of ammonium and that the action is not only to retard the formation of the crystals, but to cause those that may form to be of a soft nature.

I claim as my invention—

1. A battery solution composed of sulfate of ammonia and chlorid of ammonia, substantially as set forth.

2. A battery compound composed of sulfate of ammonia, chlorid of ammonia and chlorid of sodium, substantially as described.

Signed by me this 21st day of September, 1899.

HENRY BLUMENBERG, JR.

Witnesses:
 GEO. T. PINCKNEY,
 S. T. HAVILAND.